United States Patent [19]

Dais et al.

[11] Patent Number: 5,115,055

[45] Date of Patent: May 19, 1992

[54] HYDROPEROXIDE CATALYZED FREE RADICAL POLYMERIZATION OF VINYL AROMATIC MONOMERS

[75] Inventors: Virginia A. Dais; Duane B. Priddy, both of Midland, Mich.

[73] Assignee: The Dow Chemical Company, Midland, Mich.

[21] Appl. No.: 784,139

[22] Filed: Oct. 29, 1991

Related U.S. Application Data

[63] Continuation-in-part of Ser. No. 704,480, May 23, 1991, abandoned.

[51] Int. Cl.$^5$ .................... C08F 4/34; C08F 112/08
[52] U.S. Cl. .................... 526/225; 526/193; 526/222; 526/230; 526/346
[58] Field of Search ............... 526/213, 216, 222, 225, 526/193, 230, 346

[56] References Cited

U.S. PATENT DOCUMENTS 2,971,939  2/1961  Baer .................. 526/272 X
4,772,671  9/1988  Steeman et al. ............ 526/216

OTHER PUBLICATIONS

J. Macromol. Sci–Chem., A11(9), pp. 1697–1700 (1977).
J. Macromol. Sci–Chem., A14(1) pp. 33–50 (1980).

*Primary Examiner*—Fred Teskin

[57] ABSTRACT

High molecular weight polymers of vinyl aromatic monomers are prepared by organic hydroperoxide initiated free radical polymerization in the presence of 5 to 5000 ppm of a soluble organic acid having pKa from 0.5 to 2.5.

4 Claims, No Drawings

HYDROPEROXIDE CATALYZED FREE RADICAL POLYMERIZATION OF VINYL AROMATIC MONOMERS

This is a continuation-in-part of application Ser. No. 704,480 filed May 23, 1991, now abandoned.

BACKGROUND OF THE INVENTION

The present invention relates to a process for polymerization of vinyl aromatic monomers. More particularly the present invention relates to an improved process for the hydroperoxide catalyzed free radical polymerization of vinyl aromatic monomers to make high molecular weight polymers.

Currently, production of high molecular weight vinyl aromatic polymers, particularly polymers having weight average molecular weights ($M_w$) of greater than 300,000, is best performed by the use of anionic polymerization techniques. This is due to the extremely slow polymerization rates required to make high molecular weight vinyl aromatic polymers using free radical chemistry. Disadvantageously however, anionic polymerization processes require expensive anionic initiators and tend to produce discolored products due to the presence of residual lithium-containing salts. In addition, anionic processes utilize different equipment than free radical processes. Consequently commercial producers of vinyl aromatic polymers by means of free radical chemistry must invest in anionic polymerization equipment in order to prepare very high molecular weight polymers. Finally, anionic polymerization cannot be employed to prepare many copolymeric products. In many cases the monomer is not amenable to anionic polymerization. In other cases block copolymers are formed due to unequal reactivities of the comonomers.

It would be desirable if it were possible to produce high molecular weight polyvinyl aromatic resins utilizing free radical polymerization equipment while obtaining rates that are commercially practical. Thus it is to the attainment of the preparation of such high molecular weight polymers via free radical polymerization techniques that the present invention is directed.

According to the present invention there is provided a process for hydroperoxide catalyzed free radical polymerization of a vinyl aromatic monomer to prepare a high molecular weight polymer characterized in that the polymerization is conducted in the presence of from 5 to 5000 parts per million (ppm) of a soluble organic acid having a pKa from 0.5 to 2.5 at 25° C. It has been surprisingly discovered that in the presence of such an amount of these acids the free radical polymerization rate is substantially increased thereby allowing the attainment of high molecular weight polymers in reasonable reaction times. Surprisingly, the same advantage is not observed when peroxide initiators other than hydroperoxides are employed.

The vinyl aromatic monomers usefully employed according to the present process include styrene, ring alkyl substituted styrene, particularly $C_{1-4}$ alkyl and especially methyl ring substituted styrenes and α-methylstyrene. A preferred monomer is styrene. The polymerization can also include a comonomer to prepare vinyl aromatic copolymers. The comonomer must be noninterfering with the acid. Examples include (meth)acrylonitrile, (meth)acrylic acid and $C_{1-4}$ alkyl esters thereof, N-$C_{1-4}$ alkyl maleimides, N-phenyl maleimide, maleic anhydride, etc. In addition the polymerization may be conducted in the presence of predissolved elastomer to prepare impact modified, grafted rubber containing products.

By the term "soluble" is meant that the acid is sufficiently soluble in the reaction mixture to achieve the indicated concentration of organic acid. Preferred organic acids are those that are miscible with neat styrene monomer. Highly preferred organic acids include the $C_{1-20}$ alkyl and aryl substituted sulfonic and phosphonic acids. Examples include methane sulfonic acid, toluene sulfonic acid, camphorsulfonic acid, napthalene sulfonic acid, methyl phosphonic acid, phenyl phosphonic acid, etc. Strong acids, i.e., organic acids having a pKa less than 0.5, are not desired due to increased incidence of cationic polymerization as opposed to the desired free radical initiation. Weaker acids, ie. those having pKa greater than 2.5 are not effective in improving molecular weight. Preferred acids have pKa from 1.0 to 2.0. A preferred organic acid is camphorsulfonic acid.

It has been discovered that at increased concentrations of organic acid, cationic polymerization also becomes prevalent. Generally, acids with higher pK, i.e. weaker acids, may be employed in higher concentration within the above range without detrimental effect. Cationic polymerization is undesirable because it results in extremely low molecular weight oligomer formation. Even small quantities of such low molecular weight product would significantly reduce the molecular weight average of the resulting product. Most preferred are amounts of organic acid from 50 to 5000 ppm. The amount of acid is measured with respect to the molar quantity of vinyl aromatic monomer.

An organic hydroperoxide free radical initiator is employed to further improve the rate of free radical initiation. By the term "hydroperoxide" are included mono- and bis-hydroperoxides. Preferred organic hydroperoxides are $C_{4-10}$ alkyl hydroperoxides and $C_{4-10}$ alkylene bishydroperoxides. Most preferred organic hydroperoxides are t-alkyl hydroperoxides, such as t-butyl hydroperoxide, t-amyl hydroperoxide and 2,5-dimethylhexane-2,5-dihydroperoxide. Suitably the amount of such hydroperoxide utilized is from 50 to 2000 ppm based on total monomer, preferably from 100 to 1000 ppm.

The monomer may be polymerized in bulk, i.e., in the absence of a diluent, or in the presence of a diluent, i.e., in solution. Suitable diluents include toluene, ethylbenzene, and other noninterfering organic liquids. Preferably the reaction is conducted under bulk polymerization conditions. Suitable polymerization temperatures are from 25 to 200° C., preferably from 85 to 180° C.

The polymerization rate according to the present process is substantially increased and the resulting product has substantially increased molecular weight compared to products prepared by hydroperoxide initiated free radical polymerization in the absence of an organic acid. However, because the product has increased molecular weight, the conversion rate is less at higher acid concentrations compared to lower acid concentrations. That is, the higher molecular weight polymers require longer reaction times despite incrementally faster polymerization rates. Preferred polymer product has a molecular weight (Mw) from 100,000 to 1,000,000, more preferably 150,000 to 500,000, based on a polystyrene standard as measured by size exclusion chromatography.

The products are employed in applications where high molecular weight vinylaromatic polymers have previously found suitable uses. Particularly preferred are molding polymers comprising the presently prepared polymeric products. The product may be blended with other ingredients such as mold release additives, lubricants, colorants, ignition resistant additives, impact modifiers, glass fibers, as well as other resins such as polyvinylaromatic resins having different molecular weights, polyphenylene oxides, polycarbonates, elastomeric copolymers such as styrene-butadiene block copolymers, polybutadiene, etc.

Having described the invention the following example is provided as further illustrative and is not to be construed as limiting.

EXAMPLE 1

Aliquots of styrene monomer which was purified by degassing and contacting with alumina were placed in glass tubes. In comparative run a and example 1, 500 ppm of camphor sulfonic acid was added to the tube. In Example 1 and comparative run b, 500 ppm t-butyl hydroperoxide was added. Thus Example 1 contained both camphor sulfonic acid and t-butyl hydroperoxide. The tubes were dried over anhydrous calcium chloride, sealed under reduced pressure and placed in an oil bath at 110° C. for 2 hours. The tubes were withdrawn and the polymer was recovered. The weight average molecular weight of the polystyrene in each tube was measured using size exclusion chromatography. Conversions were determined by weight loss after drying a portion of the polymer at 240° C. Results are contained in Table 1.

TABLE 1

| Run | Percent Solids | Mw | Mn |
|-----|----------------|-----------|---------|
| a*  | 3.3            | 1,257,000 | 754,000 |
| b*  | 19.9           | 336,000   | 171,000 |
| 1   | 24.5           | 411,000   | 221,000 |

*not an example of the invention

It may be seen that the use of both a hydroperoxide initiator and an acid gave both high molecular weight polymer and high polymer conversion.

What is claimed is:

1. A process for free radical polymerization of styrene to prepare high molecular weight polystyrene characterized in that the polymerization is conducted in the presence of from 5 to 5,000 ppm of a soluble organic acid having pKa from 0.5 to 2.5° C. and from 50 to 2000 ppm of an organic hydroperoxide.

2. A process according to claim 1 wherein the organic acid is methane-sulfonic acid.

3. A process according to claim 1 wherein the organic acid is camphorsulfonic acid.

4. A process according to claim 1 wherein the polystyrene has a Mw from 100,000 to 1,000,000.

* * * * *

UNITED STATES PATENT AND TRADEMARK OFFICE
CERTIFICATE OF CORRECTION

| | | |
|---|---|---|
| PATENT NO. | : | 5,115,055 |
| DATED | : | May 19, 1992 |
| INVENTOR(S) | : | Virginia A. Dais, Duane B. Priddy |

It is certified that error appears in the above-identified patent and that said Letters Patent is hereby corrected as shown below:

Claim 1, Column 4, line 21, "2.5° C. and" should correctly read --2.5 at 25°C. and--.

Signed and Sealed this

Seventeenth Day of August, 1993

*Attest:*

BRUCE LEHMAN

*Attesting Officer*    *Commissioner of Patents and Trademarks*